US006996114B2

(12) United States Patent
Sébire

(10) Patent No.: US 6,996,114 B2
(45) Date of Patent: Feb. 7, 2006

(54) METHOD FOR RATE MATCHING TO SUPPORT INCREMENTAL REDUNDANCY WITH FLEXIBLE LAYER ONE

(75) Inventor: Benoist Sébire, Espoo (FI)

(73) Assignee: Nokia Corporation, Espoo (FI)

( * ) Notice: Subject to any disclaimer, the term of this patent is extended or adjusted under 35 U.S.C. 154(b) by 525 days.

(21) Appl. No.: 10/280,272

(22) Filed: Oct. 25, 2002

(65) Prior Publication Data

US 2004/0081103 A1    Apr. 29, 2004

(51) Int. Cl.
H04M 11/00    (2006.01)
G01R 31/08    (2006.01)
(52) U.S. Cl. ...................... 370/403; 370/252
(58) Field of Classification Search ............ None
See application file for complete search history.

(56) References Cited

U.S. PATENT DOCUMENTS

| 6,341,125 | B1 * | 1/2002 | Hong et al. ............... 370/335 |
| 6,697,986 | B2 * | 2/2004 | Kim et al. ................. 714/751 |
| 6,704,898 | B1 | 3/2004 | Furuskär et al. | |
| 2002/0120900 | A1 * | 8/2002 | Hong .......................... 714/748 |
| 2002/0166093 | A1 * | 11/2002 | Eroz et al. ................. 714/755 |
| 2003/0133497 | A1 | 7/2003 | Kinjo et al. | |
| 2003/0159100 | A1 | 8/2003 | Buckley et al. | |

OTHER PUBLICATIONS

3rd Generation Partnership Project; Technical Specification Group GSM/EDGE Radio Access Network; Flexible Layer One: (Release 6); 3GPP TR 45.902 V0.3.0 (Nov. 2002); Nov. 2001.

3rd Generation Partnership Project; Technical Specification Group GSM/EDGE Radio Access Network; Flexible Layer One; (Release 6); 3GPP TR ab.cde Vx.y.z; (Jun. 2002); downloaded from the Internet before Oct. 25, 2002; (later became 3GPP TR 45.902 V0.3.0 (Nov. 2002)).

3rd Generation Partnership Project; Technical Specification Group Radio Access Network; Multiplexing and channel coding (FDD)(Release 5); 3GPP TS 25.212 V5.1.0 (Jun. 2002).

* cited by examiner

Primary Examiner—Huy D. Vu
Assistant Examiner—Cynthia L. Davis
(74) Attorney, Agent, or Firm—Ware, Fressola, Van Der Sluys & Adolphson LLP

(57) ABSTRACT

A method for rate matching in equipment used as part of, or in communication with, a radio access network implementing FLO (Flexible Layer One) so as to provide retransmission with incremental redundancy, the method using a rate-matching algorithm based on determining a starting parameter $e_{ini}$, the method characterized by: a step (21) of providing a retransmission parameter R controlled by the RLC protocol layer and having typically a value of one for a first retransmission and a next higher value for each subsequent transmission; a step (24) of determining a characteristic distance D related to the average distance between either punctured bits or between transmitted bits, depending on the value of the average distance between punctured bits; and a step (25) of determining a new value of $e_{ini}$ based on a cycling term having a value depending on R but modulated by D so as to never exceed D−1.

14 Claims, 3 Drawing Sheets

METHOD FOR RATE MATCHING TO SUPPORT INCREMENTAL REDUNDANCY WITH FLEXIBLE LAYER ONE

FIELD OF THE INVENTION

The invention pertains to wireless communication, and more particularly to rate matching of transport channels to physical channels in a wireless communication system.

BACKGROUND OF THE INVENTION

A Flexible Layer One (FLO) protocol layer, based on the same specifications for a FLO protocol layer provided for UTRAN (Universal Mobile Telecommunication System (UMTS) Terrestrial Radio Access Network), is currently being developed for GERAN (GSM (Global System for Mobile Communications)/EDGE (Enhanced Data rates for GSM Evolution Radio Access Network). For signalling at least, FLO must support data transfer in acknowledged RLC (Radio Link Control) mode. Incremental redundancy, as used in selective type II hybrid ARQ, available in EGPRS (Enhanced General Packet Radio Service), is a powerful means by which to enhance link level and system level performance of data transfer in acknowledged RLC mode. In incremental redundancy, upon reception failure, the retransmission of a data block is not identical with its initial transmission, but instead a different puncturing pattern is used (i.e. some bits of a block already encoded for forward error correction are either punctured so as not to be transmitted or are repeated, thus providing the number of bits required for the transmission time interval in which the block will be transmitted, i.e. thus providing a rate-matched encoded block), and when the original transmission and retransmission(s) are combined, the result is increased redundancy and a greater likelihood of forward error correction by the receiver. The existing rate matching algorithm for FLO does not allow incremental redundancy to be used. For the same encoded data block, the rate matching algorithm always produces the same puncturing pattern.

Thus, the prior art does not teach providing incremental redundancy (selective type II hybrid ARQ) for FLO, either as it will be implemented in GERAN or as it is implemented in UTRAN; to provide incremental redundancy requires rate matching of the transport channel to the physical channel, and what is needed is, ideally, a simple and efficient way of providing such rate matching so as to provide incremental redundancy with FLO, either in UTRAN or GERAN.

SUMMARY OF THE INVENTION

Accordingly, the present invention provides a method for rate matching in equipment used in connection with a radio access network, the method using a rate-matching algorithm based on determining a starting parameter $e_{ini}$, the method characterized by: a step of determining a characteristic distance D for an encoded block equal to the average distance between punctured bits for the encoded block when the average distance between punctured bits is greater than two, or equal to the average distance between transmitted bits when the average distance between punctured bits for the encoded block is less than two, or equal to two otherwise; and a step of determining a new value of the starting parameter $e_{ini}$ based on a cycling term having a value depending on a retransmission parameter R, the retransmission parameter R having a predetermined initial value for an original transmission and having different values for at least some subsequent retransmissions, the cycling term also depending on the characteristic distance D so as to never have a value exceeding a predetermined maximum value; thereby providing retransmission with incremental redundancy.

In accord with the first aspect of the invention, the predetermined maximum value may be one less than the characteristic distance D.

In accord with the first aspect of the invention the radio access network may implement Flexible Layer One (FLO).

Also in accord with the first aspect of the invention, the rate matching may include either repeating bits of an encoded block of a transport channel or puncturing bits of an encoded block of a transport channel so as to provide over the transport channel a rate-matched encoded block having a number of bits sufficient to ensure a predetermined total channel bit rate for a transmission time interval after multiplexing with all other transport channels to be transmitted by a same physical channel.

Also in accord with the first aspect of the invention, the radio access network may be a GSM (Global System for Mobile communications)/EDGE (Enhanced Data rates for GSM Evolution) Radio Access Network (GERAN).

Also in accord with the first aspect of the invention, the radio access network may be a Universal Mobile Telecommunications System (UMTS) Terrestrial Radio Access Network (UTRAN).

Still also in accord with the first aspect of the invention, the retransmission parameter R may be zero for the original transmission.

Still also in accord with the first aspect of the invention, the value of the retransmission parameter R for the original transmission may be incremented by one for each successive retransmission. Further, the cycling term may be computed according to the expression R mod D.

Still also in accord with the first aspect of the invention, the characteristic distance D may be determined according to:

$$D = \frac{e_{plus}}{e_{minus}} \text{ for } \frac{e_{plus}}{e_{minus}} > 2, \text{ and}$$

$$D = \frac{e_{plus}}{e_{plus} - e_{minus}} \text{ for } \frac{e_{plus}}{e_{minus}} < 2,$$

and otherwise, D=2, wherein $e_{plus}$ and $e_{minus}$ are either as set out in 3GPP TR 45.902 or are as follows:

$e_{plus} = 2 \times N_{i,j}$, and $e_{minus} = 2 \times |\Delta N_{i,j}|$, in which: $N_{i,j}$ is the number of bits in an encoded block before rate matching on transport channel i with transport format combination j; and $\Delta N_{i,j} = Z_{i,j} - Z_{i-1,j} - N_{i,j}$ for i=1 . . . I, where I is the number of active transport channels, and $Z_{0,j} = 0$, and $$Z_{i,j} = \left\lfloor \frac{\left(\sum_{m=1}^{i} RM_m \times N_{m,i}\right) \times N_{data}}{\sum_{m=1}^{I} RM_m \times N_{m,j}} \right\rfloor,$$

with $RM_i$ the semi-static rate matching attribute for transport channel i, and $N_{data}$ the total number of bits available in a radio block for the coded composite transport channel (CCTrCH) corresponding to the active transport channels.

Still also in accord with the first aspect of the invention, the starting parameter may be determined according to:

$$e_{ini} = 1 + (R \bmod D) \times e_{minus} \text{ for } \frac{e_{plus}}{e_{minus}} \geq 2, \text{ and}$$

$$e_{ini} = 1 + (R \bmod D) \times (e_{plus} - e_{minus}) \text{ for } \frac{e_{plus}}{e_{minus}} < 2,$$

wherein $e_{plus}$ and $e_{minus}$ are either as set out in 3GPP TR 45.902 or are as follows:

$e_{plus} = 2 \times N_{i,j}$, and $e_{minus} = 2 \times |\Delta N_{i,j}|$, in which: $N_{i,j}$ is the number of bits in an encoded block before rate matching on transport channel i with transport format combination j; and $\Delta N_{i,j} = Z_{i,j} - Z_{i-1,j} - N_{i,j}$ for i=1 ... I, where I is the number of active transport channels, and $Z_{0,j} = 0$, and $$Z_{i,j} = \left\lfloor \frac{\left(\sum_{m=1}^{i} RM_m \times N_{m,j}\right) \times N_{data}}{\sum_{m=1}^{I} RM_m \times N_{m,j}} \right\rfloor,$$

with $RM_i$ the semi-static rate matching attribute for transport channel i, and $N_{data}$ the total number of bits available in a radio block for the coded composite transport channel (CCTrCH) corresponding to the active transport channels.

In a second aspect of the invention, a transmitter of a radio access network is provided, characterized in that it comprises means for performing the steps of the method provided by the first aspect of the invention.

In a third aspect of the invention, a transmitter of a wireless terminal for communicating with a radio access network is provided, characterized in that it comprises means for performing the steps of the method provided by the first aspect of the invention.

In a fourth aspect of the invention, a system is provided, comprising a transmitter of a radio access network and also a transmitter of a wireless terminal for communicating with the radio access network, the transmitters characterized in that each comprises means for performing the steps of the method provided by the first aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIGS. 3A–C are illustrations of calculations according to the invention.

BEST MODE FOR CARRYING OUT THE INVENTION

Background on the Existing Rate Matching Algorithm for FLO in GERAN

The invention will now be described in an application to a GERAN (GSM/EDGE Radio Access Network) implementing FLO, i.e. a GERAN as set out in 3GPP TR 45.902 (Release 6), *GSM/EDGE Radio Access Network; Flexible Layer One*; (Release 6). (See also GP-022194, *Draft Technical Report on FLO*; Ericsson, Nokia and Siemens; TSG GERAN #11; Los Angeles, Calif., USA; 26–30 Aug. 2002.) (An overview of GERAN is available in 3GPP TS 43.051, although not mentioning FLO.) It should be understood however that the invention is also of use in other radio access networks, including e.g. some implementations of UTRAN (UMTS Terrestrial Radio Access Network).

Figure 1:
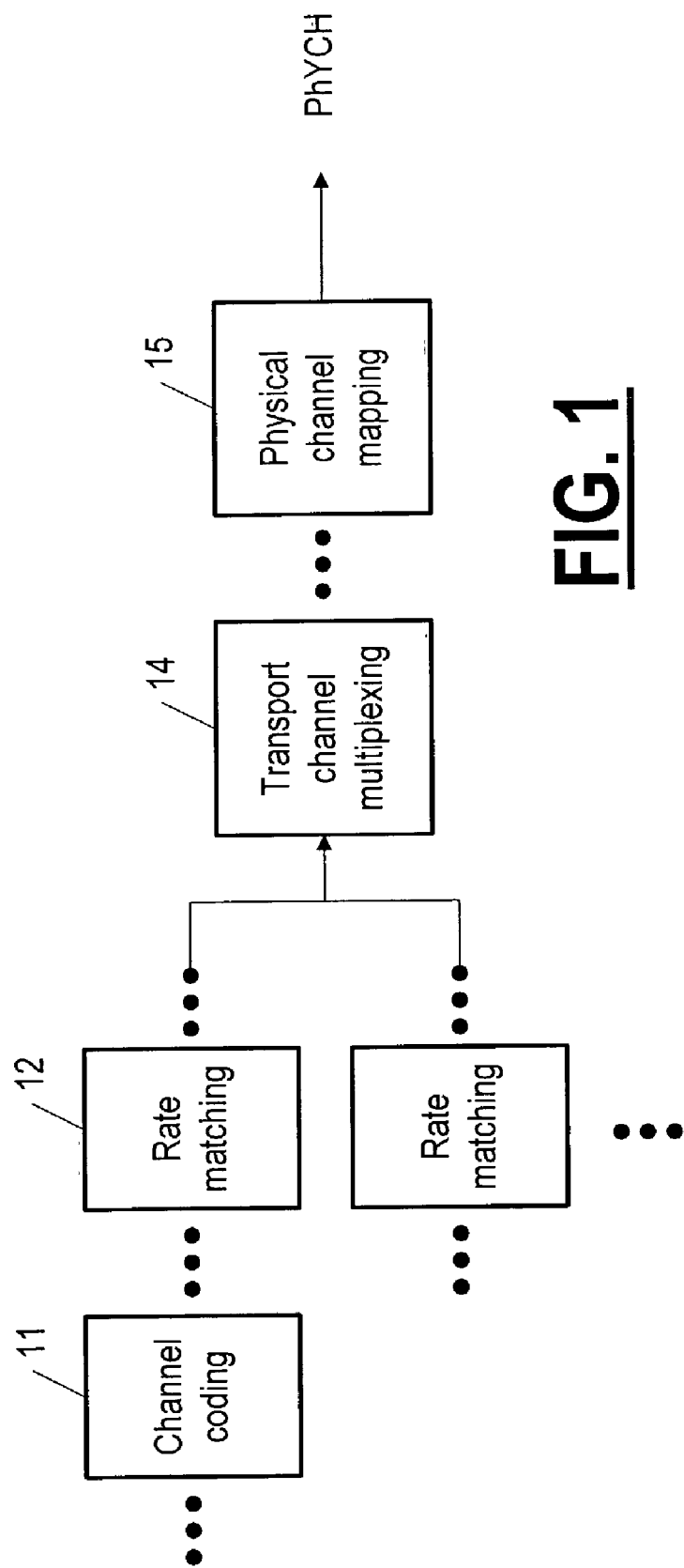
FIG. 1 is a block diagram of an apparatus in which the present invention may be used.

Referring now to FIG. 1, a portion of a digital transmission system of the type for which the present invention could be used is shown as including: a channel encoding module 11 (one transport block per transport channel entering the encoding module) for providing an encoded block of bits (one encoded block per transport block) including redundancy to allow for error correction at the receiver (via the coded bits of the encoded block); a rate matching module 12 for providing what is called a radio frame, i.e. a rate-matched encoded block, the rate matching including either repeating bits of an encoded block of a transport channel or puncturing bits of an encoded block of a transport channel so as to provide over the transport channel a rate-matched encoded block having a number of bits sufficient to ensure a predetermined total channel bit rate for a transmission time interval after multiplexing with all other transport channels to be transmitted by a same physical channel; a transport channel multiplexing module 14 for multiplexing the radio frames (rate-matched encoded blocks) from each transport channel so as to provide a multiplexed bit stream for a coded composite transport channel; and a physical channel mapping module for providing elements of the multiplexed bit stream to a physical channel. (As mentioned, the encoded block is encoded to enable forward error correction by including sufficient redundancy that if some bits of the encoded block are not properly received, the receiver is nevertheless able to properly decode the encoded block. In general, as long as not too many consecutive bits are distorted in transmission, the encoded block can be properly decoded. Thus, in rate matching, as long as not too many consecutive bits are punctured, the rate-matched encoded block can be decoded.)

As mentioned, the rate matching module 12 provides a rate-matched encoded block starting with the (forward error correction) encoded block. In the rate matching, bits of the encoded block (on a transport channel) are repeated or punctured to provide a desired number of bits (a number that will provide rate-matching to the physical channel) for transmission during a TTI. The number of bits that are punctured or repeated to achieve the desired number can vary from TTI to TTI because the bandwidth can change if the number of transport channels that are active changes or the number of bits in the encoded blocks of other transport channels changes, or both. As mentioned, bits are repeated or punctured to ensure that the total bit rate after TrCH (transport channel) multiplexing is equal to the total channel bit rate of the allocated basic physical channel.

When only one transport channel is active at a time, the coding rate (the number of data bits compared to the total number of coded bits), and so also the number of bits in the encoded block, depend only on the transport block size and on the available channel bandwidth (the bit rate capacity of the physical channel). But when more than one transport channel is active (e.g. for transport of different component streams of a multimedia data stream), the coding rate also depends on the rate matching attribute for each transport channel defined by the radio resource control protocol layer, an upper layer relative to the transport layer, each rate matching attribute serving as a weighting of the bits for the respective transport channel relative to the bits of the other transport channels. By setting different rate matching attributes for the different transport channels, the radio resource control protocol layer adjusts the coding rate of the different transport channels.

As already indicated, outputs from the rate matching are called radio frames (i.e. rate-matched encoded blocks). For each encoded block, rate matching produces one radio frame, i.e. one radio frame is produced per TrCH.

The rate matching algorithm for GERAN is based on the UTRAN rate matching algorithm, but with a few simplifications since there is no spreading factor, nor compressed mode, nor special cases such as turbo codes, and therefore many parameters of the UTRAN algorithm can be fixed either to 0 or 1 in the GERAN case.

The algorithm presented below uses the following notation:

$\lfloor x \rfloor$ Round x towards $-\infty$, i.e. the integer such that $x-1 < \lfloor x \rfloor \leq x$.

$|x|$ Absolute value of x.

I Number of TrCHs in the CCTrCH (coded composite transport channel, i.e. the data stream resulting from encoding and multiplexing of the possibly several active transport channels).

$N_{data}$ Total number of bits that are available in a radio block for the CCTrCH. (For every radio block to be transmitted, one radio frame, i.e. one rate-matched encoded block, from each active TrCH is delivered to the TrCH multiplexing. These radio frames are serially multiplexed into a CCTrCH. The coded transport format combination identifier TFCI and the CCTrCH are interleaved together on radio blocks.)

$N_{i,j}$ Number of bits in an encoded block before rate matching on TrCH i with transport format combination j.

$\Delta N_{i,j}$ If positive, number of bits that have to be repeated in an encoded block on TrCH i with transport format combination j in order to produce a radio frame.

If negative, number of bits that have to be punctured in an encoded block on TrCH i with transport format combination j in order to produce a radio frame.

If null, no bits have to be punctured nor repeated, i.e. the rate matching is transparent and the content of the radio frame is identical to the content of the encoded block on TrCH i with transport format combination j.

$RM_i$ Semi-static rate matching attribute for transport channel i.

$e_{ini}$ Initial value of variable e in the rate matching pattern determination algorithm.

$e_{plus}$ Increment of variable e in the rate matching pattern determination algorithm.

$e_{minus}$ Decrement value of variable e in the rate matching pattern determination algorithm.

$Z_{i,j}$ Intermediate calculation variable.

The GERAN FLO rate matching algorithm is as follows:

For each radio block using transport format combination j, the number $\Delta N_{i,j}$ of bits to be repeated or punctured within one encoded block for each TrCH i out of I active transport channels, is calculated using the following equations:

$Z_{0,j}=0$, $$Z_{i,j} = \left\lfloor \frac{\left(\sum_{m=1}^{i} RM_m \times N_{m,j}\right) \times N_{data}}{\sum_{m=1}^{I} RM_m \times N_{m,j}} \right\rfloor \text{ for all } i = 1 \ldots I,$$

and $\Delta N_{i,j} = Z_{i,j} - Z_{i-1,j} - N_{i,j}$ for all i=1 . . . I.

For the calculation of the rate matching pattern of each TrCH i, a starting parameter $e_{ini}$ and related parameters $e_{plus}$ and $e_{minus}$ are defined as follows:

$e_{ini}=1$ (starting parameter), $e_{plus}=2 \times N_{i,j}$, and $e_{minus}=2 \times |\Delta N_{i,j}|$.

The rate matching rule is as follows:
If $\Delta N_{i,j} < 0$ (puncturing is to be performed)
$e=e_{ini}$ (initial error between current and desired puncturing ratio)
m=1 (index of current bit)
do while $m \leq N_{i,j}$ (or each bit of the encoded block of TrCH i)

$e=e-e_{minus}$ (update error)

if $e \leq 0$ then (check if bit number m should be punctured)

puncture bit $b_{i,m}$ (bit is punctured)

$e=e+e_{plus}$ (update error)

end if m=m+1 (next bit)

end do
else if $\Delta N_{i,j} > 0$ (repetition is to be performed)
$e=e_{ini}$ (initial error between current and desired puncturing ratio)
m=1 (index of current bit)
do while $m \leq N_{i,j}$ (for each bit of the encoded block of TrCH i)

$e=e-e_{minus}$ (update error)

do while $e \leq 0$ (check if bit number m should be repeated)

repeat bit $b_{i,m}$ (repeat bit)

$e=e+e_{plus}$ (update error)

end do m=m+1 (next bit)

end do
else ($\Delta N_{i,j}=0$)
do nothing (no repetition or puncturing)
end if.

Adaptation of the Existing FLO Rate Matching Algorithm to Provide Incremental Redundancy The invention modifies the existing FLO rate matching algorithm by redefining the starting parameter $e_{ini}$ for each retransmission, and so having the rate matching algorithm provide puncturing patterns for retransmissions that are different from that of the original transmission (but not necessarily different for each retransmission, since only a finite number of such different puncturing patterns can be provided, as explained below). The starting parameter is redefined based on two parameters, a retransmission parameter R, and a characteristic distance D, and according to the invention, the retransmission parameter R is controlled by the RLC layer and its value for each TrCH is communicated to the physical layer, where the rate matching is done.

In the preferred embodiment, the retransmission parameter R is assigned a value according to the rule: in unacknowledged and transparent RLC modes, R has a fixed value of 0 (i.e. incremental redundancy is not used); but in acknowledged RLC mode, in case incremental redundancy is used, the value of R is initially 0 and is incremented by 1 for each retransmission of the same data block. Thus, in the preferred embodiment, the parameter R can be seen as a counter of the number of retransmissions of the same data block. The physical layer then uses the retransmission parameter R to generate different puncturing patterns, if possible, i.e. if not all different puncturing patterns have been transmitted. Given a string of bits (the encoded block) b1 b2 b3 b4 b5 b6 b7 b8 b9, if every third bit is to be punctured so that for the original transmission, say, b3 and b6 and b9 are to be punctured, then there are only two possible additional puncturing patterns for retransmissions, a first one in which b2 and b5 and b8 are punctured, and a second one in which b1 and b4 and b7 are punctured. After that, the puncturing pattern repeats. The same holds true of course for a pattern in which some bits are repeated instead of being punctured. (Either kind of pattern is here called a puncturing pattern.)

The characteristic distance D is used to take into account that the puncturing pattern must repeat after a finite number of retransmissions. The characteristic distance D provided by the invention is calculated from the parameters $e_{plus}$ and $e_{minus}$ set out above in the existing FLO rate matching algorithm. For $$\frac{e_{plus}}{e_{minus}} > 2,$$

the characteristic distance D is given by:

$$D = \frac{e_{plus}}{e_{minus}} = \frac{N_{i,j}}{|\Delta N_{i,j}|},$$

and is the average distance (in bits) between punctured bits in the original transmission, whereas for $$\frac{e_{plus}}{e_{minus}} < 2,$$

D is given by:

$$D = \frac{e_{plus}}{e_{plus} - e_{minus}} = \frac{N_{i,j}}{N_{i,j} - |\Delta N_{i,j}|},$$

and is the average distance (in bits) between transmitted bits in the original transmission. For $$\frac{e_{plus}}{e_{minus}} = 2,$$

D=2 (bits) (which is the case when the average distance between punctured bits and the average distance between transmitted bits are both equal to two bits). In calculating the characteristic distance D for an encoded block, the invention also comprehends calculating the average distance between transmitted or punctured bits using other expressions not amounting to simple arithmetic averages, such as weighted averages, with different bits weighted differently, depending on bit position.

Table 1 below gives an example of an average distance between punctured bits of 3 (12/4=3) bits. In order to generate different puncturing patterns, the first pattern, i.e. the originally transmitted pattern (obtained with retransmission parameter R=0), must be shifted forward (corresponding to R=1 and R=2).

TABLE 1

Example of average distance of 3 bits between punctured bits. The letter Y at a bit position indicates the bit at the position is punctured.

| | bits | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| punctured (R = 0) | Y | — | — | Y | — | — | Y | — | — | Y | — | — |
| punctured (R = 1) | — | Y | — | — | Y | — | — | Y | — | — | Y | — |
| punctured (R = 2) | — | — | Y | — | — | Y | — | — | Y | — | — | Y |

Table 2 below gives an example of an average distance between punctured bits of 1.5 (12/8=1.5) and an average distance between transmitted bits of 3 (12/4=3). In order to generate different puncturing patterns, the original (or previous) transmission pattern must be shifted backward (again corresponding to R=1 and R=2). (If the pattern is shifted forward instead of backward, one bit will be missing; the shifted forward pattern would be YYY-YY-YY-YY and so would contain only three bits, not four.)

TABLE 2

Example of average distance between punctured bits of 1.5 bits and an average distance between transmitted bits of 3 bits.

| | bits | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| punctured (R = 0) | Y | Y | — | Y | Y | — | Y | Y | — | Y | Y | — |
| punctured | Y | — | Y | Y | — | Y | Y | — | Y | Y | — | Y |

TABLE 2-continued

Example of average distance between punctured bits of 1.5 bits and an average distance between transmitted bits of 3 bits.

| | bits | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (R = 1) punctured (R = 2) | — | Y | Y | — | Y | Y | — | Y | Y | — | Y | Y |

Thus, according to the invention, when the average distance between punctured bits is greater than or equal to 2 bits, the different puncturing patterns are obtained by shifting forward the originally transmitted pattern (corresponding to R=0). When the average distance between punctured bits is smaller than 2 bits, the different puncturing patterns are obtained by shifting backward the originally (or previously) transmitted pattern.

So to take into account that the puncturing pattern must repeat after a finite number of retransmissions, the characteristic distance D is used to provide a value based on R (which increments continually, with each retransmission) that does not ever exceed an appropriate maximum value, namely one less than the value of the characteristic distance D. Specifically, the invention uses a cycling term, R mod D (i.e. R modulus D), to determine the starting parameter $e_{ini}$. (One might say that D is used to modulate R so as to produce a value from R in the range from 0 to D−1.) According to the invention, the starting parameter $e_{ini}$ is given by the rule:

If $$\frac{e_{plus}}{e_{minus}} \geq 2,$$

then $$D = \frac{e_{plus}}{e_{minus}}$$

(average distance between punctured bits)

$e_{ini}=1+(R \bmod D) \times e_{minus}$ (to shift pattern forward), else $$D = \frac{e_{plus}}{e_{plus} - e_{minus}}$$

(average distance between transmitted bits $e_{ini}=1+(R \bmod D) \times (e_{plus}-e_{minus})$. to shift pattern backward)

Note that D tells how many different puncturing patterns are possible. For instance if 1 bit is punctured out of every 3 bits, the average distance between puncture bits is 3 and there are 3 different possible puncturing patterns: one starting from bit 1, another one starting from bit 2 and the last one starting from bit 3 (forward shift). Similarly if 2 bits are punctured every 3, the average distance between transmitted bits is 3 and there are 3 different possible puncturing patterns.

Figure 2:
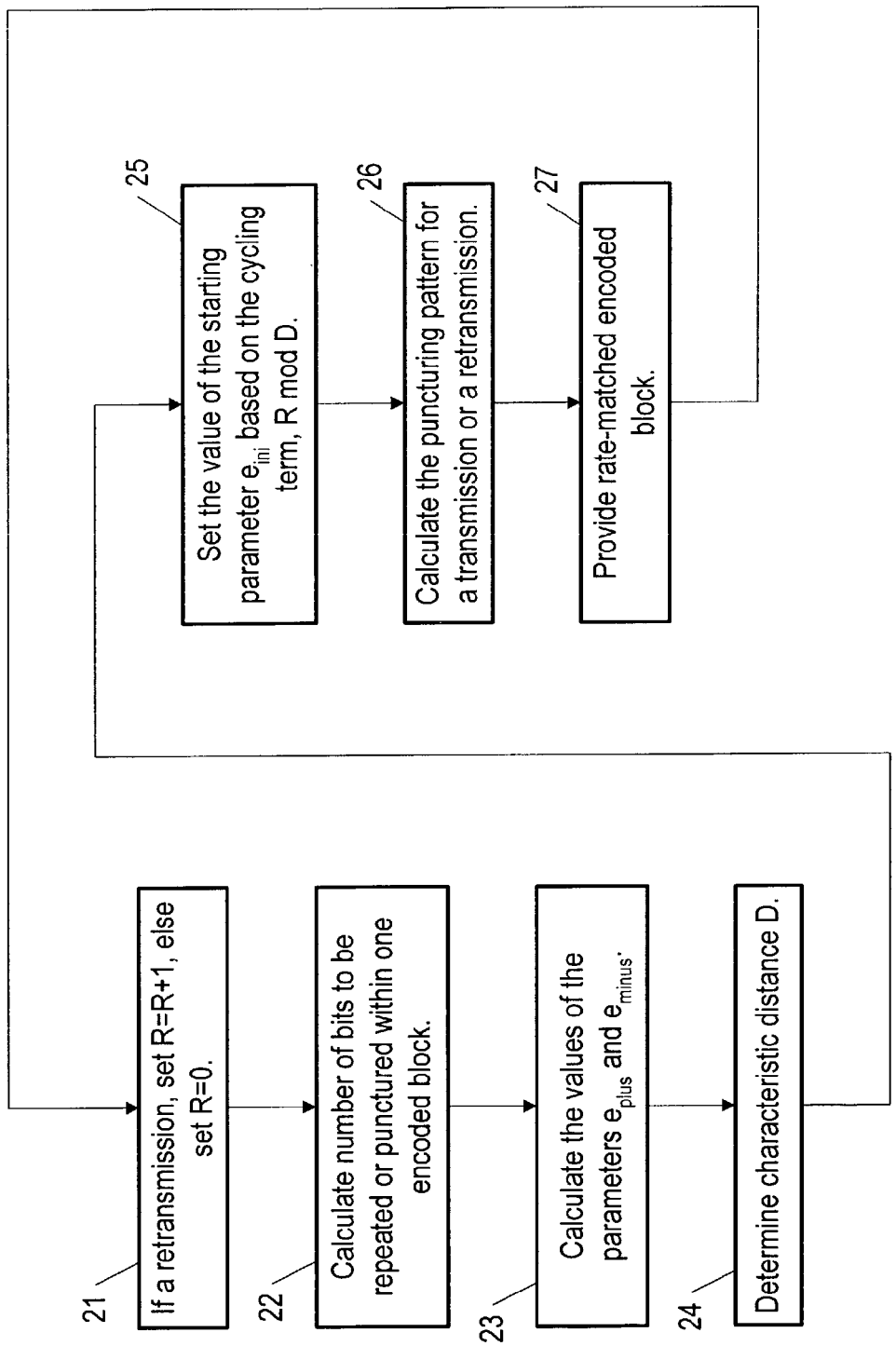
FIG. 2 is a flow chart of the method provided by the invention.

Referring now to FIG. 2, the invention is illustrated as beginning with a first step 21 in which, in case of a retransmission, the RLC protocol layer increments the retransmission parameter by one, and for an original transmission, sets the retransmission parameter to zero. In a next step 22, the physical layer, after receiving the value of the retransmission parameter R from the RLC protocol layer, calculates the number $\Delta N_{i,j}$ of bits to be repeated or punctured within the encoded block of an active transport channel, as per the FLO rate matching algorithm described above. In a next step 23, the values of the parameters $e_{plus}$ and $e_{minus}$ are calculated (again per the FLO rate matching algorithm). In a next step 24, the characteristic distance D is determined according to the invention, i.e.

$$D = \frac{e_{plus}}{e_{minus}}$$

for $$\frac{e_{plus}}{e_{minus}} > 2,$$

and $$D = \frac{e_{plus}}{e_{plus} - e_{minus}}$$

for $$\frac{e_{plus}}{e_{minus}} < 2,$$

and otherwise, D=2. Then in a next step 25, the value of the starting parameter $e_{ini}$ is set, according to the invention, based on the cycling term, R mod D, i.e. according to the rule, $e_{ini}=1+(R \bmod D) \times e_{minus}$ for $$\frac{e_{plus}}{e_{minus}} \geq 2$$

and $e_{ini}=1+(R \bmod D) \times (e_{plus}-e_{minus})$ for $$\frac{e_{plus}}{e_{minus}} < 2.$$

Figures 3A, 3B, 3C:
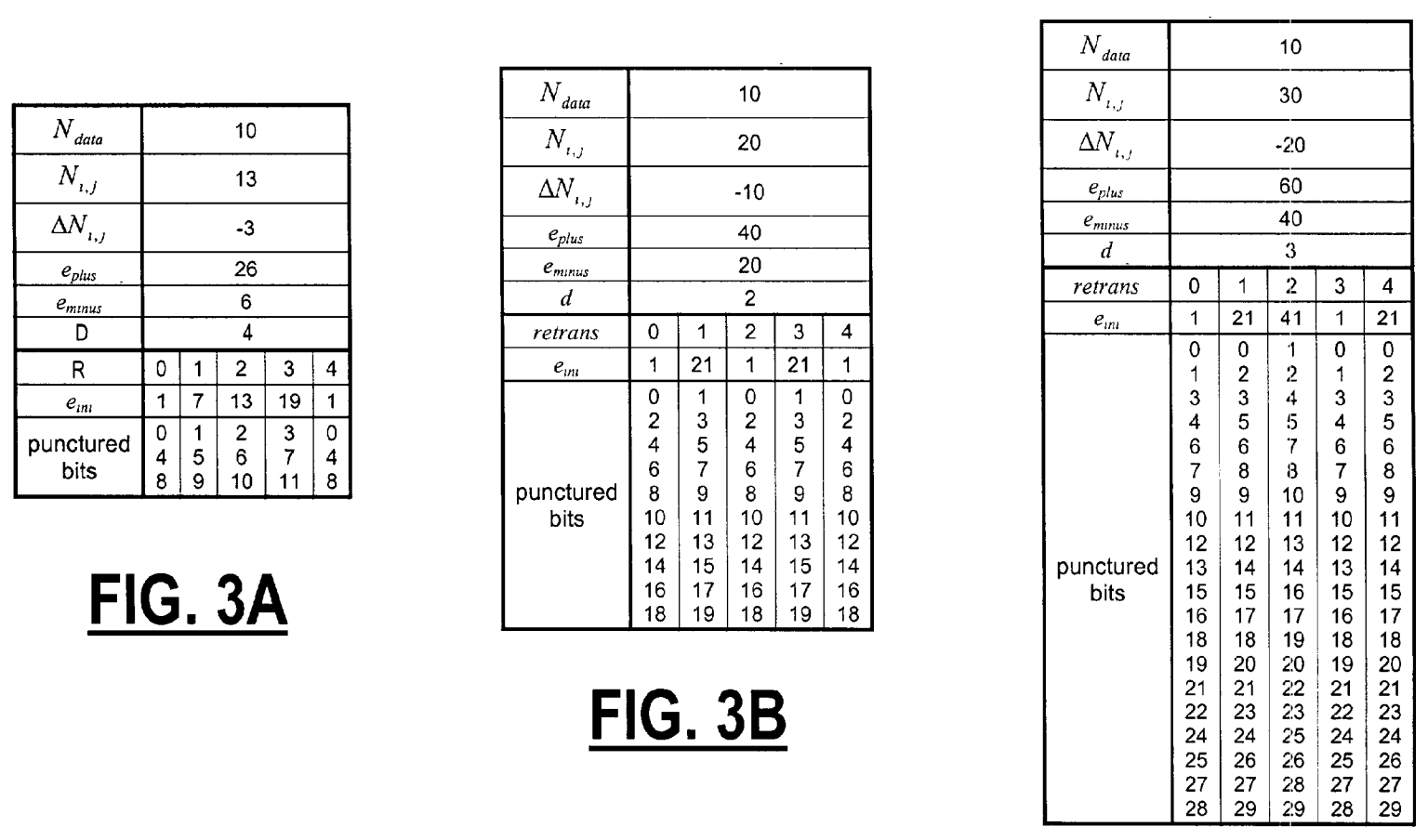

In a next step 26, the puncturing pattern for a transmission or a retransmission is then determined, based on $e_{ini}$, and then in a last step 27, the rate-matched encoded block is provided for mapping to the physical channel. (The process set out in FIG. 2 is performed for each active transport channel.) Referring now to FIGS. 3A–C, three examples are given illustrating the use of the invention. In the examples, only one transport channel is active (I=1), and the size of the CCTrCH (coded composite transport channel) is limited to 10 bits ($N_{data}=10$). Note that the value of the rate matching attribute does not matter since only one transport channel is active in our example. Also note that the bits are numbered starting from 0.

Advantages

An advantage of the invention is that the RLC layer need only manage (assign a value to) the retransmission parameter R. There is no need for upper layers to know how many different retransmissions are possible. As a result, the upper layers are relieved from having to store details specific to the physical layer. For instance, because of the flexibility allowed by FLO, some other transport channels can become active even when retransmissions are ongoing, and thus change D and the management of R. If upper layers had to be aware of these kind of details, implementations of the upper layers would be much more complex, possibly so much so that the flexibility aimed at with FLO would not be feasible. Without the cycling term R mod D, FLO could not accept other transport channels as long as retransmissions are being sent for a transport channel.

The amount of possible different puncturing patterns may vary in time and depend on many factors specific to the physical layer, such as the coding rate, the size of the transport block, and the activity of other transport channels. Thus the physical layer may not always be able to generate a different puncturing pattern for each value of R. When it happens that the physical layer cannot do so, according to the invention, the physical layer will simply loop (cycle) among the finite number of different possible puncturing patterns.

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for rate matching in equipment used in connection with a radio access network, the method using a rate-matching algorithm based on determining a starting parameter $e_{ini}$, the method characterized by:
   a step of determining a characteristic distance D for an encoded block equal to the average distance between punctured bits for the encoded block when the average distance between punctured bits is greater than two, or equal to the average distance between transmitted bits when the average distance between punctured bits for the encoded block is less than two, or equal to two otherwise; and
   a step of determining a new value of the starting parameter $e_{ini}$ based on a cycling term having a value depending on a retransmission parameter R, the retransmission parameter R having a predetermined initial value for an original transmission and having different values for at least some subsequent retransmissions, the cycling term also depending on the characteristic distance D so as to never have a value exceeding a predetermined maximum value;
   thereby providing retransmission with incremental redundancy.

2. The method of claim 1, wherein the predetermined maximum value is one less than the characteristic distance D.

3. The method of claim 1, wherein the radio access network implements Flexible Layer One (FLO).

4. The method of claim 1, wherein the rate matching includes either repeating bits of an encoded block of a transport channel or puncturing bits of an encoded block of a transport channel so as to provide over the transport channel a rate-matched encoded block having a number of bits sufficient to ensure a predetermined total channel bit rate for a transmission time interval after multiplexing with all other transport channels to be transmitted by a same physical channel.

5. The method of claim 1, wherein the radio access network is a GSM/EDGE Radio Access Network (GERAN).

6. The method of claim 1, wherein the radio access network is a Universal Mobile Telecommunications System (UMTS) Terrestrial Radio Access Network (UTRAN).

7. The method of claim 1, wherein the retransmission parameter R is zero for the original transmission.

8. The method of claim 1, wherein the value of the retransmission parameter R for the original transmission is incremented by one for each successive retransmission.

9. The method of claim 8, wherein the cycling term is given by the expression R mod D.

10. The method of claim 1, wherein the characteristic distance D is determined according to:

$$D = \frac{e_{plus}}{e_{minus}} \quad \text{for} \quad \frac{e_{plus}}{e_{minus}} > 2,$$

and $$D = \frac{e_{plus}}{e_{plus} - e_{minus}} \quad \text{for} \quad \frac{e_{plus}}{e_{minus}} < 2,$$

and otherwise, $$D=2,$$

wherein and $e_{plus}$ and $e_{minus}$ are either as set out in 3GPP TR 45.902 or are as follows:

$$e_{plus} = 2 \times N_{i,j}, \text{ and}$$

$$e_{minus} = 2 \times |\Delta N_{ij}|,$$

in which: $N_{i,j}$ is the number of bits in an encoded block before rate matching on transport channel i wihth transport format combination j; and $\Delta N_{i,j} = Z_{i,j} - Z_{i-1,j} - N_{i,j}$ for i=1 . . . I, where I is the number of active transport channels, and $$Z_{0,j}=0, \text{ and}$$

$$Z_{i,j} = \left\lfloor \frac{\left(\sum_{m=1}^{i} RM_m \times N_{m,j}\right) \times N_{data}}{\sum_{m=1}^{I} RM_m \times N_{m,j}} \right\rfloor,$$

with $RM_i$ the semi-static rate matching attribute for transport channel i, and $N_{data}$ the total number of bits available in a radio block for the coded composite transport channel (CCTrCH) corresponding to the active transport channels.

11. The method of claim 1, wherein the starting parameter is determined according to:

$$e_{ini}=1+(R \bmod D) \times e_{minus} \text{ for}$$

$$\frac{e_{plus}}{e_{minus}} \geq 2,$$

and $$e_{ini}=1(R \bmod D) \times (e_{plus}-e_{minus}) \text{ for}$$

$$\frac{e_{plus}}{e_{minus}} < 2,$$

wherein $e_{plus}$ and $e_{minus}$ are either as set out in 3GPP TR 45.902 or are as follows:

$$e_{plus}=2 \times N_{i,j}, \text{ and}$$

$$e_{minus}=2 \times |\Delta N_{i,j}|,$$

in which: $N_{i,j}$ is the number of bits in an encoded block before rate matching on transport channel i with transport format combination j; and $\Delta N_{i,j}=Z_{i,j}-Z_{i-1,j}-N_{i,j}$ for i=1 . . . I, where I is the number of active transport channels, and $Z_{0,j}=0$, and $$Z_{i,j} = \left\lfloor \frac{\left(\sum_{m=1}^{i} RM_m \times N_{m,j}\right) \times N_{data}}{\sum_{m=1}^{I} RM_m \times N_{m,j}} \right\rfloor,$$

with $RM_i$ the semi-static rate matching attribute for transport channel i, and $N_{data}$ the total number of bits available in a radio block for the coded composite transport channel (CCTrCH) corresponding to the active transport channels.

12. A transmitter of a radio access network, characterized in that it comprises means for performing the steps of claim 1.

13. A transmitter of a wireless terminal for communicating with a radio access network, characterized in that it comprises means for performing the steps of claim 1.

14. A system, comprising a transmitter of a radio access network and also a transmitter of a wireless terminal for communicating with the radio access network, the transmitters characterized in that each comprises means for performing the steps of claim 1.

* * * * *

UNITED STATES PATENT AND TRADEMARK OFFICE
CERTIFICATE OF CORRECTION

PATENT NO. : 6,996,114 B2
DATED : February 7, 2006
INVENTOR(S) : Benoist Sebire

It is certified that error appears in the above-identified patent and that said Letters Patent is hereby corrected as shown below:

<u>Column 12,</u>
Line 46, after "wherein" delete "and".
Line 53, delete "wihth" and insert -- with --.

Signed and Sealed this

Ninth Day of May, 2006

JON W. DUDAS
*Director of the United States Patent and Trademark Office*